(12) United States Patent
Seyitoglu et al.

(10) Patent No.: US 12,457,102 B2
(45) Date of Patent: Oct. 28, 2025

(54) SYSTEMS AND METHODS FOR ENERGY EFFICIENT AND USEFUL BLOCKCHAIN PROOF OF WORK

(71) Applicant: UNIVERSITY OF SOUTH FLORIDA, Tampa, FL (US)

(72) Inventors: Efe Ulas Akay Seyitoglu, Tampa, FL (US); Attila A. Yavuz, Tampa, FL (US); Thang Hoang, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 95 days.

(21) Appl. No.: 18/252,766

(22) PCT Filed: Nov. 12, 2021

(86) PCT No.: PCT/US2021/059233
§ 371 (c)(1),
(2) Date: May 12, 2023

(87) PCT Pub. No.: WO2022/104132
PCT Pub. Date: May 19, 2022

(65) Prior Publication Data
US 2024/0007282 A1 Jan. 4, 2024

Related U.S. Application Data

(60) Provisional application No. 63/116,019, filed on Nov. 19, 2020, provisional application No. 63/113,162, filed on Nov. 12, 2020.

(51) Int. Cl.
*H04L 9/08* (2006.01)
*H04L 9/00* (2022.01)
(Continued)

(52) U.S. Cl.
CPC .............. *H04L 9/0869* (2013.01); *H04L 9/14* (2013.01); *H04L 9/3239* (2013.01); *H04L 9/3247* (2013.01); *H04L 9/50* (2022.05)

(58) Field of Classification Search
None
See application file for complete search history.

(56) References Cited

U.S. PATENT DOCUMENTS 11,514,176 B1 * 11/2022 Magerkurth .......... H04L 9/0825
2016/0379212 A1 12/2016 Bowman et al.
(Continued)

FOREIGN PATENT DOCUMENTS

WO 2022/104132 A1 5/2022

OTHER PUBLICATIONS

International Search Report of Related PCT PCT/US2021/059233, mailed Mar. 17, 2022, 4 pages.
(Continued)

*Primary Examiner* — Joseph P Hirl
*Assistant Examiner* — Hassan Saadoun
(74) *Attorney, Agent, or Firm* — HUSCH BLACKWELL LLP

(57) ABSTRACT

The disclosure provides systems and methods for an improved Proof of Work (PoW) technique that enforces the creation of cryptographic tokens while solving the PoW puzzle. The systems and methods disclosed herein more efficiently utilize the high computational and energy consumption in attempts to solve PoW puzzles, by combining the computations necessary for several types of cryptographic functions (e.g., public-key cryptographic methods). For example, systems and methods disclosed herein may reuse pre-computed commitments, while still preserving the traditional and accepted PoW protocols.

18 Claims, 6 Drawing Sheets

(51) Int. Cl.
  *H04L 9/14*     (2006.01)
  *H04L 9/32*     (2006.01)

(56) References Cited

U.S. PATENT DOCUMENTS

| | | | |
|---|---|---|---|
| 2017/0075941 | A1 | 3/2017 | Fonlow-Bates |
| 2019/0251554 | A1* | 8/2019 | Ma .................. H04L 9/3247 |
| 2019/0305968 | A1* | 10/2019 | Versteeg ............ H04L 9/3271 |
| 2020/0064783 | A1* | 2/2020 | Tran .................. F24F 11/72 |
| 2020/0153801 | A1* | 5/2020 | Ma .................. G06Q 20/382 |
| 2021/0192012 | A1* | 6/2021 | Ohashi .............. H04L 9/0841 |

OTHER PUBLICATIONS

International Written Opinion of Related PCT PCT/US2021/059233, mailed Mar. 17, 2022, 5 pages.

Kumar et al. "Proof-of-work consensus approach in blockchain technology for cloud and fog computing using maximization-factorization statistics." IEEE Internet of Things Journal 6.4 (2019): 6835-6842.

Xue et al., "Proof of contribution: A modification of proof of work to increase mining efficiency." 2018 IEEE 42nd annual computer software and applications conference (COMPSAC). vol. 1. IEEE, 2018. pp. 636-644.

Shoker, "Sustainable blockchain through proof of exercise," 2017 IEEE 16th International Symposium on Network Computing and Applications (NCA), Cambridge, MA, 2017, pp. 1-9.

\* cited by examiner

SYSTEMS AND METHODS FOR ENERGY EFFICIENT AND USEFUL BLOCKCHAIN PROOF OF WORK

CROSS-REFERENCE TO RELATED APPLICATIONS

This application represents the U.S. national stage of PCT/US2021/059233, filed Nov. 12, 2021, which is based on, and claims the benefit of U.S. Provisional Patent Application Ser. No. 63/113,162, filed Nov. 12, 2020, and U.S. Provisional Patent Application Ser. No. 63/116,019, filed Nov. 19, 2020, each of which are incorporated by reference in their entireties.

FIELD

The present disclosure relates generally to the field of computed randomness, such as used in blockchain methodologies and encryption techniques. Systems and methods herein relate to a more energy efficient way of performing certain blockchain-related tasks and other cryptographic tasks.

BACKGROUND

Proof of work (PoW) algorithms are used in numerous applications as a means of data verification. For example, a PoW hashing operation is one way in which a Blockchain-based dataset can be verified. In a very general sense, PoW approaches can be advantageous when security is a concern, because they are difficult (in terms of time and computational resources) to produce, but comparatively easy to verify. For example, miners in a blockchain-based system might perform PoWs to generate a new block, and the system may be setup so as to require high computational resources to do so.

PoW algorithms provide a means of consensus in blockchains and therefore plays a central role in various blockchain applications. They are widely adopted for the several reasons, some of which are the very attributes that make them computationally expensive. Specifically, a traditional PoW is often designed to achieve (to varying degrees) the following properties: (i) Hardness: Each attempt to solve the PoW puzzle should succeed in a similar probability. This gives incentives to invest computational resources in the PoW, because the puzzle rate (i.e., the hashing effort) grows linearly with the possibility of finding a solution. (ii) Efficiency: A puzzle will have a solution, and that solution should be generated/verified in polynomial time. (iii) Completeness: Only a valid puzzle solution should be accepted by the verifier.

To give a concrete example of how much computation a typical PoW requires, generating a new block on the Bitcoin can requires approximately $2^{68}$ or more hashing operations. For example, to generate a new Bitcoin block, a miner will repeatedly perform a hashing operation (e.g., SHA-256) in a "brute force" manner until the resulting value from the hashing operation is less than a target value. Depending on how the system sets the target value, the number of hashing operations might be quite larger. Extrapolated over a large system processing thousands upon thousands of Bitcoin operations, the hashing operations underlying the PoW scheme would represent a very large drain on resources (e.g., opportunity cost of processing power that could be used for other purposes, time, energy, etc.).

Even though the classical PoW algorithm is, in the sense of computations involved, wasteful, it has proven desirable for a number of reasons. For example, in a classical PoW algorithm, the desired output can generally only be achieved through a brute force approach and cannot typically be predicted otherwise. This incentivizes nodes to devote more resources to have a greater chance of receiving the mining reward (e.g., in a Bitcoin environment). And, in a classical PoW algorithm, each individual attempt to find the desired hash should succeed in a very similar probably. In other words: $(Pr(H(nonce1\|str^*))=Pr(H(nonce2\|str^*)+/-\epsilon$. The pseudorandomness used in the "puzzle" generally does not need to depend on the data state (e.g., the cryptocurrency state).

As the use of systems that utilize PoW rises, the amount of computations being performed by participating computational devices (e.g., CPUs, GPUs, etc.) increases dramatically. And, as computational needs increase, energy needs increase as well. And, all of the hash computations required for a PoW algorithm (except for the last, successful computation that fits within the target) are essentially "waste" and consume energy without providing a benefit. Generally, the electricity consumption of some of popular Blockchains like Bitcoin are extremely high. At one point, Bitcoin-related electricity consumption was even comparable to the total electricity consumption of Ireland. As another example, Bitcoin was measured to have consumed 39 TWh of electricity in 2018, which at the time was more than the electricity consumption of Qatar and Bulgaria.

Wasted hash computations of PoW algorithms make up a very big chunk of the electricity consumption for Blockchains and similar cryptographic functions. Therefore, it would be desirable to develop useful proof of work algorithms that minimize the waste of electricity/computation resources.

Some prior attempts have been made to achieve reductions in wasted computation (and, thus, energy consumption). Some examples can be referred to as Proof of Useful Algorithms (PoUW). However, these have suffered from some undesirable attributes.

First, they have tended to sacrifice desirable properties of a classical PoW, which could lead to undesirable incentives to participants in a Blockchain system. A Proof of Stake (PoS) could be one example.

Second, they have tended to represent more fundamental changes to how secure systems operate, and thus would be difficult to implement when existing systems (e.g., Bitcoin) already rely on standard PoW methods. For example Bitcoin, Ethereum, and other existing, popular Blockchain systems rely on classical PoW. Jumping to a different consensus algorithm, such as PoS would be difficult to achieve and could be rejected by users simply because of the fundamental changes involved.

Because the classical PoW is the most widely adopted algorithm, it would also be desirable to develop a system for performing proof of work computations that preserves the classical PoW architecture while still saving energy resources.

SUMMARY

Figure 1:
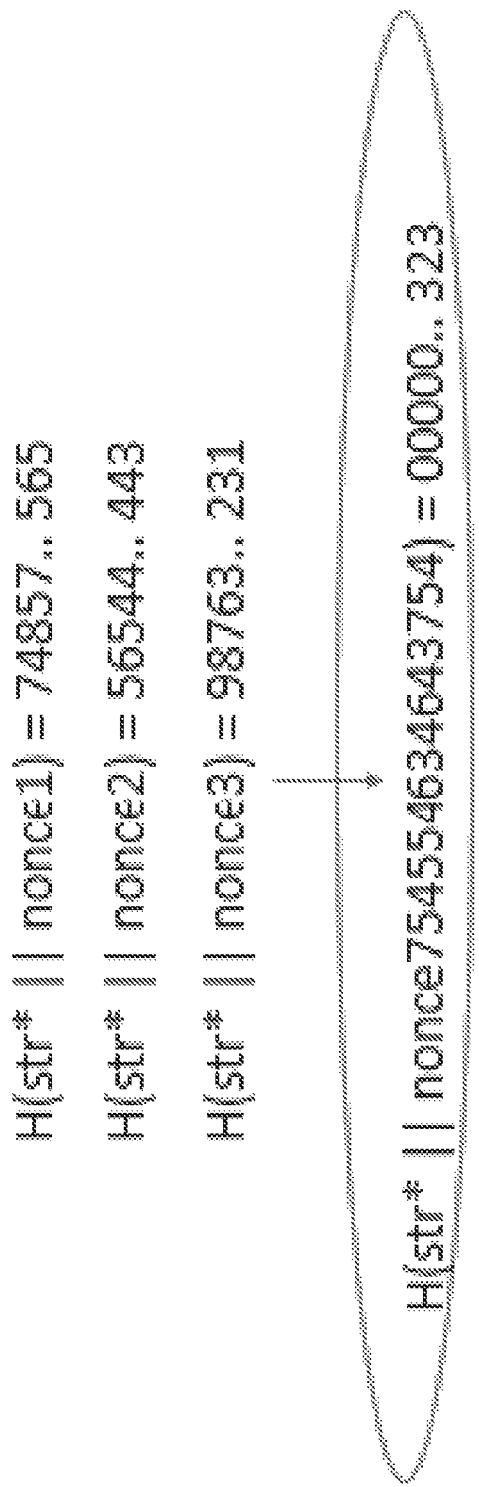
FIG. 1 shows an illustration of a simplified and non-limiting example of a classical PoW algorithm.

The features and advantages of the present disclosure may be embodied in many different types of systems and in many methods or processes.

For example, in one aspect, a system is provided, comprising at least one Blockchain processing node and at least one memory having stored thereon instructions which, when executed, cause the system to: i. perform a proof-of-work operation; ii. generate at least one cryptographic commitment while performing the proof-of-work operation; iii. store the cryptographic commitment in the at least one memory; iv. determine if the proof-of-work operation was solved, and if not repeat steps i-iii; and v. provide the cryptographic commitment to at least one cryptographic processing node.

In another aspect, a method is provided for reducing energy consumption of cryptographic computations, comprising: determining at least one desired type of cryptographic commitment; generating a random value; transforming the random value into a cryptographic output value; performing a Blockchain function based upon at least one of the random value and the cryptographic output value; storing the random value and cryptographic output value as a cryptographic commitment of the desired type; and providing the cryptographic commitment for subsequent use in a cryptographic operation.

DETAILED DESCRIPTION

This disclosure presents various systems and methods that can put to use new PoW algorithms that overcome the disadvantages of prior attempts to streamline PoW-based systems. In some such systems and methods, cryto-tokens or commitments are created during the hashing or "consensus" stage of a classical PoW approach. Though classical PoW algorithms utilize a large amount of computation power, the new techniques, methods and systems disclosed herein can leverage this computation power to create commitments that can be used by each individual node at any time in the future. Having been created, these commitments can be leveraged to reduce the need for future computations in future verification activities.

The various systems and methods disclosed herein are able to still provide the desirable properties of classical PoW approaches. Therefore, the improved PoW algorithm is a better candidate to be deployed in popular Blockchain systems for offline/online systems where commitments are pre-processed in the offline stage and used in the online stage.

In other words, the systems and methods disclosed herein create useful randomness, through which several advantages are achieved. First, they result in reduced computation (especially reducing unproductive or "wasted" computation) thereby resulting in reduced energy waste. Second, they still preserve a typical PoW architecture, thereby avoiding the hurdles of heavy transactions costs and inconsistent adoption of alternative consensus algorithms. Thus, the various systems and methods disclosed herein can be thought of as generally implementing a scheme of "proof of useful randomness" or "PoUR."

In traditional PoW schemes, random values (nonces) are calculated through computationally-expensive algorithms, then tried once as a potential solution to the PoW puzzle. In other words, the random values are calculated for a one-time use (attempt to solve the PoW puzzle), and then discarded (unless the value happens to be the correct value to solve the problem). However, this is expensive and wasteful, as generating a Bitcoin block takes on average $2^{32}$ attempts, and mostly importantly, those nonces are just discarded. In some embodiments and techniques disclosed herein, the wasted randomness generation in PoW can be turned into an opportunity, by leveraging the computations normally performed with respect to the nonce to produce (special) useful randomness that can harnessed by future cryptographic tasks. Thus, systems implementing the PoUR algorithm can randomly generate (one-way) algebraic commitments that not only serve as the randomness source for PoW but also can be integrated into a vast range of public key cryptographic primitives. These useful randomness computations can be thought of as Pre-computed Algebraic Commitments (PAC), which can be integrated into various cryptographic schemes in offline-online settings (e.g., digital signatures, key exchange).

As will be described further below, systems utilizing the advantages described herein as part of a PoUR technique save considerable energy by creating useful-randomnesses that can be used by various cryptographic operations as needed. For example, after $2^{30}$ puzzle-solving attempts, PoUR saves around $2.18*10^5$ J worth of energy in elliptic-curve settings. This energy-saving process does not come with the cost of any additional efficiency overhead to the protocol since the target value of the puzzle could be adjusted to accommodate the desired hardness (i.e. the necessary number of attempts to solve the puzzle on average). Similarly, systems and methods that implement the techniques described herein retain sufficient security characteristics. In experiments performed, the inventors have proved security of the implementation of PoUR on commodity hardware.

Similarly, the systems and methods described herein can be useful for a wide variety of cryptographic schemes, especially those that are amenable to an offline-online phase, in which commitments/tokens can be generated via a PoUR-style technique and then later consumed by a cryptographic function. Some cryptographic schemes that could benefit from a PoUR-style approach include, but are not limited to, digital signatures, key-exchanges, public-key encryption, zero-knowledge proofs, random beacons and their quantum-safe variants. The systems and methods described herein entail no or minimal modification of existing PoW algorithms in popular platforms such as Bitcoin, and the generated commitments from PoW algorithms can be saved and used in such other cryptographic functions in the future, eliminating the need for those functions to recreate commitments.

The disclosure below will first describe general attributes of "classical"-type PoW algorithms. Then, the disclosure will describe two sets of examples (Example Set #1 and Example Set #2), each including explanations of variables, notations, and symbols used in the associated Equations and Algorithms as well as examples of implementations of systems and methods in which an improved PoW algorithm could be advantageous. Then, the disclosure will describe various features and attributes and embodiments of improved PoW algorithms, followed by examples of new systems and methods that can employ improved PoW algorithms.

Attributes of Classical PoW Algorithms

A proof of work consensus algorithm can be thought of as a puzzle that the nodes of a network attempt to solve. To incentivize dedication of computational resources to solve the puzzle, "rewards" can be offered to the computational resources striving to solve the puzzle. For example, in systems like Bitcoin, whichever node on the network solves the puzzle first, earns the mining reward.

In some systems in which the PoW algorithm is based on hashing operations, nodes in the network attempt to solve the puzzle by concatenating a nonce to a pre-determined string. The goal of the nodes is to find out whether the output of the hash (i.e. H (nonce∥str*)) is less than a predetermined target value T. This puzzle is conceptually illustrated in FIG. 1. FIG. 1 shows an illustration of one example of a classical PoW algorithm. As illustrated in FIG. 1, all the nodes in the network perform a series of hash operations based on an input value, each operation having a different nonce. The system is structured so that the goal of the nodes' work is to find a hash output that is lower than a pre-determined value T. Whichever node finds the specific nonce gets the mining reward. The nodes cannot predict which nonce will achieve a hash output satisfying the goal, so they repeatedly perform hashing operations using random nonces in a "brute force" approach. These random nonces need to be generated by the nodes in order for the nodes to keep computing hash operations.

Systems and methods that employ these algorithms are wasteful because the generation of the random nonce for concatenation to the string is nothing but a random attempt to find the desired hash output. So, these systems are causing nodes to spend substantial amounts of computational resources (and, thus, energy) to repeatedly generate extremely large amounts of random values (nonces), only one of which is ever put to use.

Example Set #1

Explanation of Notations and Symbols—Example Set #1

For improved understanding of the various Equations and Algorithms presented with respect to Example Set #1, non-limiting explanations of the notations and symbols utilized in those Equations are presented below in Table 1 below.

TABLE 1

| | |
|---|---|
| PK | Public key |
| sk | Secret key |
| ∥ | Concatenation |
| T | Target value in PoW |
| α | Generator of a subgroup of order q |
| p | Prime number |
| nonce | A random value |
| q | Prime number |
| M | Message |
| ε | Very small number that can be overlooked |

TABLE 1-continued

| | |
|---|---|
| $\{0, 1\}^*$ | Binary values of any length |
| str* | A string of arbitrary length |
| $H : \{0, 1\}^K \to \{0, 1\}^K$ | A hash function that is treated as random oracle. |
| $X_r$ | A random number generated by the Node "X" |
| $X_c$ | A commitment number generated by the Node "X" |
| Sig | Signature generation algorithm |
| Kg | Key generation algorithm |
| Ver | Signature verification algorithm |
| High | High bits of a string |
| Low | Low bits of a string |
| $c_i$ and $C_i$ | Cryptographic tokens such that $C_i$ is created from $c_i$. |

Figure 3:
FIG. 3 is a block diagram demonstrating certain data flow aspects of one approach to an improved PoW technique in accordance with various teachings of the present disclosure.

FIG. 3 shows a high level representation of an improved PoW technique. The Representation in FIG. 3 is merely to illustrate certain functionality of improved PoW algorithms in accordance with this disclosure, and is not meant to be limiting. In FIG. 3, $c_i$ and $C_i$ are cryptographic tokens such that $C_i$ is created from $c_i$. To preserve the desirable properties of classical PoW algorithms, the improved scheme concatenates a nonce with the blockchain str* and takes the hash of it just like the classical PoW algorithm.

However, the nonce to be concatenated with the str* are to be created in a fashion that permits the generation of commitments. Exemplary pseudocode of the improved PoW algorithm is provided below:

Algorithm 1 Improved PoW Algorithm $(c, C, \{0,1\}^w) \leftarrow \text{PoW}_{Setup}(1^K, \text{str}^*, \text{list})$ :

1: $c \xleftarrow{\$} \mathbb{Z}_q^*$

2: $C \leftarrow \alpha^c \mod p$
3: list.add ($<c,C>$)
4: return (c, C, H(C∥str*))

$(C, \{0,1\}^w) \leftarrow \text{PoW}(1^K, \text{str}^*, T)$ :

1: (c, C, hashOutput) $\leftarrow \text{PoW}_{Setup}(1^K, \text{str}^*)$
2: list = List ( )
3: while hashOutput > T do
4:   (c, C, hashOutput) $\leftarrow \text{PoW}_{Setup}(1^K, \text{str}^*, \text{list})$
5: if $\alpha^c \mod q$ = C then return (C, hashOutput)
6: else terminate the process Description of Certain Compatible Cryptographic Functions—Example Set #1

Digital Signatures. To illustrate how an improved PoW could be leveraged by systems and methods for processing digital signatures, a standard Schnorr scheme for verifying digital signatures is shown as an example. To understand how the scheme helps reduce the traditional digital signature creation overhead, only the signature generation algorithm of Schnorr needs to be shown. Therefore the signature generation algorithm of Schnorr is presented below.

| Algorithm 2 Schnorr Signature Scheme |
| --- |
| $(sk, PK) \leftarrow$ Schnorr.Kg $(1^K)$ :<br>1: Generate large primes q and p > q such that q\|(p − 1)<br>2: Select a generator $\alpha$ of the subgroup G of order q in $\mathbb{Z}_p^*$<br><br>3: return $(sk \xleftarrow{\$} \mathbb{Z}_q^*,\ PK \leftarrow \alpha^{sk} \bmod p)$<br><br>and params $\leftarrow (q, p, \alpha)$ as the system-wide parameters<br>$(\sigma) \leftarrow$ Schnorr.Sig $(sk, M)$ :<br><br>1: $r \xleftarrow{\$} \mathbb{Z}_q^*$<br><br>2: $R \leftarrow \alpha^r \bmod p$<br>3: $e \leftarrow H(M\|R)$<br>4: $s \leftarrow (r - e \cdot sk) \bmod q$<br>5: return $\sigma = (s, e)$<br>    $(0, 1) \leftarrow$ Schnorr.Ver $(PK, M, \sigma = <s, e>)$ :<br>1: $R' \leftarrow Y^e \alpha^s \bmod p$<br>2: if $e = H(M\|R')$ then<br>3:    return 1<br>4: else<br>5:    return 0 |

Figure 2:
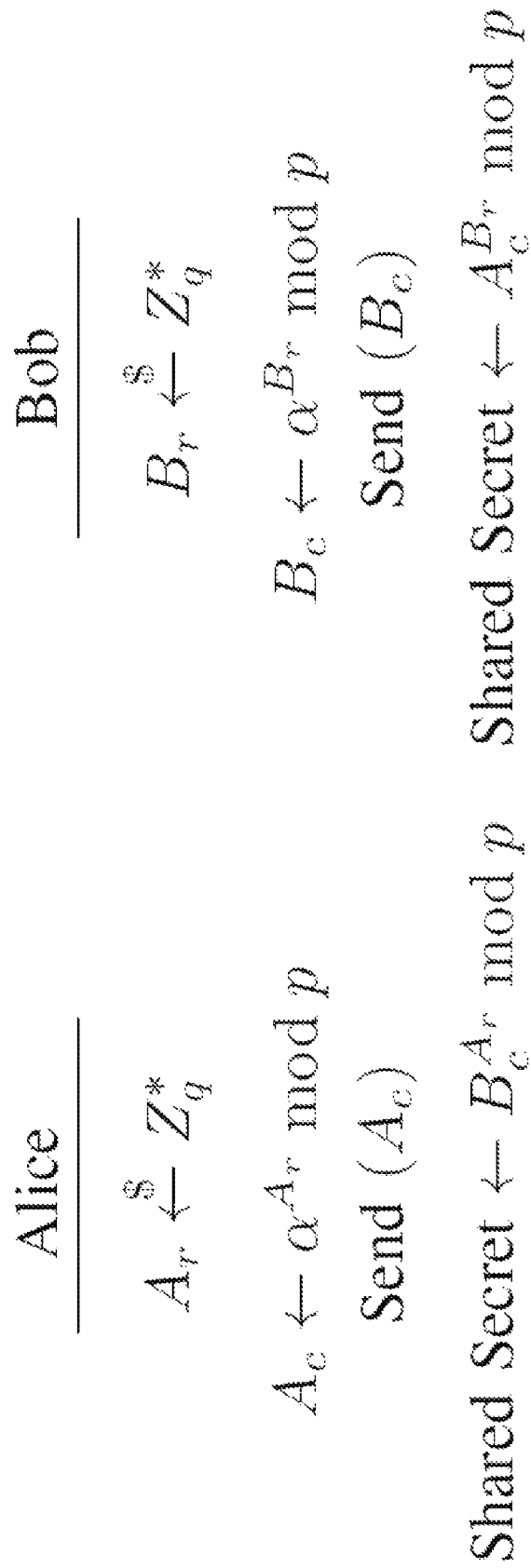
FIG. 2 shows an illustration of a simplified and non-limiting example of Diffie-Hellman key exchange protocol.

Key Exchange Mechanisms. Another use-case of the improved PoW technique is with key exchanges. In the description of the present disclosure, potential ways that the scheme could save with commitment generation time in terms of key-exchange are described. A very popular key-exchange mechanism, the Diffie-Hellman key exchange protocol, is used as an example to show how this can be done. The Diffie-Hellman key exchange protocol is shown in FIG. 2.

The improved PoW disclosed herein can also be used for pre-processing of the commitments in the encryption algorithms. The Elgamal encryption process is now presented. As described below, the Elgamal encryption process is another example of a process that can be improved using the improved PoW algorithm.

| Algorithm 3 Elgamal Encryption |
| --- |
| $(sk, PK) \leftarrow$ Elgamal.Kg$(1^K)$ :<br><br>1: Choose $sk \xleftarrow{\$} \mathbb{Z}_q^*$<br><br>2: $Y \leftarrow \alpha^{sk} \bmod p$<br>3: $PK \leftarrow (Y, q, \alpha)$<br>4: return $(sk, PK)$<br>    $c \leftarrow$ Elgamal.Enc $(M, PK, p, \alpha)$ :<br><br>1: $r \xleftarrow{\$} \mathbb{Z}_q^*$<br><br>2: $K_E \leftarrow \alpha^r \bmod p$<br>3: $K_M \leftarrow PK^r \bmod p$<br>4: $c \leftarrow (K_E, M \cdot K_M)$<br>5: return $c = <K_E, M \cdot K_M>$<br>    $M \leftarrow$ Elgamal.Dec $(c = <K_E, M \cdot K_M>, sk)$ :<br>1: $K_T \leftarrow K_E^{sk}$<br>2: $M \leftarrow M \cdot K_M \cdot K_T^{-1} \bmod p$<br>3: return M |

Post-Quantum Algorithms. The improved PoW algorithm is also useful for situations where a commitment needs to be generated in a post-quantum scheme. To illustrate the improved idea, the method of generating secret/public keys in one of the popular post-quantum signatures named Dilithium (Cryptographic Suite for Algebraic Lattices) is now described.

| Algorithm 4 Dilithium Key Generation Algorithm |
| --- |
| $(sk, PK) \leftarrow$ Dilithium.Kg( )<br>1:    $A \leftarrow R_q^{k \times l}$<br>2:    Choose two vectors $s_1$ and $s_2$ in $R_q$ with small coefficients<br>3:    $t \leftarrow A \cdot s_1 + s_2$<br>4:    return $(sk = (s_1, s_2, t, A), PK = (A, t))$<br>    $(\sigma) \leftarrow$ Dilithium.Sig $(sk, msg)$<br>1:    $y \leftarrow$ Choose a vector of length "l" that is small enough<br>2:    $w_1 \leftarrow$ High $(Ay)$<br>3:    $c \leftarrow H(M \| w_1)$<br>4:    Do rejection sampling on $(y + c \cdot s_1)$ if not satisfied, restart<br>    $(0, 1) \leftarrow$ Dilithium.Ver $(PK, msg, \sigma)$<br>1:    $w'_1 \leftarrow$ High $(A \cdot z - ct)$<br>2:    Do rejection sampling on $(y + c \cdot s_1)$ until satisfied |

The improved PoW puzzle that permits the creation of commitments while preserving the desirable properties of the PoW is now described in detail.

Application of Improved PoW Algorithms in Cryptographic Functions—Example Set #1

Several exemplary use-cases of improved PoW techniques are now described. It is to be understood that the various systems, methods, and techniques disclosed herein are not limited to the following applications.

Digital Signatures: In applications involving verification of digital signatures, improved PoW techniques in accordance with this disclosure can be used for nodes that wish to pre-compute the parts of a signature. To illustrate the idea, Schnorr signatures can be leveraged as shown below, although similar applicability may be found in other alterative signature methods and variations of the Schnorr method. In Algorithm 5 below, the variable "list" is global, and does not need to be accessed via the parameters.

| Algorithm 5 Schnorr Signature Generation Algorithm With Improved PoW Algorithm |
| --- |
| $(\sigma) \leftarrow$ Schnorr.Sig $(sk, M)$ :<br>1: if list.isEmpty( ): then<br><br>2:    $r \xleftarrow{\$} \mathbb{Z}_q^*$<br><br>3:    $R \leftarrow \alpha^r \bmod p$<br>4: else<br>5:    $(r, R) \leftarrow$ list.pop( )<br>6: $e \leftarrow H(M \| R)$<br>7: $s \leftarrow (r - e \cdot sk) \bmod q$<br>8: return $\sigma = (s, e)$ |

It is shown that the improved PoW solution is a mechanism that saves resources by creating commitments during the puzzle solving. These commitments can be used in a variety of ways. In Algorithm 5, it is shown how the commitments could be used for a digital signature.

Secret/Public Keys: Another use-case of the improved solution is the generation of secret/public keys. The secret key (sk) is a random value in mod q. Using a generator ($\alpha$), the public key (PK) can be created as $\alpha^{sk}$ mod p (please see line 3 of the Schnorr key generation). By definition, the PK is also a random value in mod q. In the improved solution, nodes try to retrieve the desired hash output by continuously creating secret/public key pairs. Nodes will have to use the generated public key as nonce to be concatenated with the str*. Assume that the desired hash output is obtained (i.e. the PoW puzzle is solved) in N tries. Compared to the classical PoW algorithm, the improved solution will result in a save of N−1 extra sk/pk pairs (equivalent to resources needed to do N−1 exponentiations). This resource saving is very similar in other use-cases as well. An example for which the improved PoW algorithm could provide the pre-processing of commitment services is the RSA cryptosystem. The improved PoW Algorithm could be used for pre-computation of public key generation operation in the RSA.

Key-Exchange: One of the most popular key exchange algorithms is the Diffie-Hellman key exchange. In this key exchange protocol, two parties A (Alice) and B (Bob) create their own random number (denoted by $A_r$ and $B_r$ respectively). Then a commitment to these random numbers are generated by $\alpha^{A_r}$ and $\alpha^{B_r}$. To achieve faster online runtime execution, it is possible to pre-create these commitments with the improved PoW algorithm (see $A_r$, $B_r$ and $A_c$, $B_c$ of the DH key exchange in the preliminaries). Another instantiation of the improved PoW algorithm that can potentially preprocesses commitments could be applicable to other key exchange mechanisms.

Encryption Schemes: the pre-processed commitments in the improved PoW algorithm can also be used in Elgamal encryption. The pre-processed commitment pairs could be used as the first two lines of the key generation process of the Elgamal or be used as the first two lines of the Elgmal encryption (see Algorithm 2).

Post-Quantum Algorithms: the improved PoW algorithm provides support for generating commitments for the post-quantum constructions. Commitment components in the Dilithium key generation algorithm (line 1 and 3) and signature generation algorithm (lines 1 and 2), can be a good example for pre-processed commitments in the offline stage.

The foregoing example use cases are either based on the discrete logarithm problem (DLP), or lattices. However, the improved techniques disclosed herein can be used in extensions of the DLP. Some examples are in elliptic curve settings (e.g. Ed34419, FourQ). It is also to be noted that commitment creation can be a very costly operation (e.g. exponentiation). Therefore, the nodes that use the improved PoW algorithm can adjust the target value to create optimal number of commitments that they desire without giving up on the hardness of the PoW algorithm.

Example Set #2

Explanation of Notations and Symbols—Example Set #2

Definition 1: AOWF: an Algebraic One-way Function. AOWF can be used in many cryptographic domains, such as ECDLP, DLP and Post-Quantum Cryptography. These functions, which are leveraged in PoUR, may be thought of as comprising two algorithms Gen, F:
1) $K \leftarrow Gen(1^\kappa)$: Given the security parameter $\kappa$, $Gen(1^\kappa)$ outputs a key K. The key K determines the order of the groups $A_K$ and $B_K$ for F.
2) $F_K: A_K \rightarrow B_K$: For input $\alpha \in A_K$, there is an output $b \in B_K$ such that $b = F_K(a)$ is computed in polynomial-time. However, given b, it should be infeasible for a probabilistic polynomial-time (PPT) adversary A to come up with a function F' such that $Pr[F'(a') = b] \geq \epsilon$.
3) $\forall \kappa \in \mathbb{N}$, $K \leftarrow Gen(1^\kappa)$ such that K constitutes an order for $A_K$ and $B_K$ in $F_K: A_K \rightarrow B_K$.
4) Efficient group operations can be performed: $F(A_K) \oplus F(B_K) = F(A_K \oplus B_K)$ where $\oplus$ is an operator over the ring R.

AOWF can be utilized in various types of cryptographic domains and associated functions, such as EDLP, DLP and Post-Quantum Cryptography. These can cryptographic functions and their various operations (including AOWF) are leveraged in, and made more efficient by, the techniques described herein include PoUR for energy saving purposes.

Definition 2: Given an elliptic curve $E(F_q)$ over a finite field $F_q$, ECDLP asks to find a value $k \in \mathbb{Z}_q$ such that $P_2 = k \cdot P_1$ where $P_1$, $P_2$ are points on $E(F_q)$.

Definition 3. Short Integer Solution Problem (SIS): Given a collection of n-dimensional modulo q (prime number) vectors $\tilde{v}_1, \ldots, \tilde{v}_m \in \mathbb{Z}_q^n$, the SIS problem asks to find a collection of non-trivial $s_1, \ldots, s_m \in \{-1, 0, 1\}$ such that $s_1 \cdot \tilde{v}_1 + \ldots + s_m \cdot \tilde{v}_m = \tilde{v}_0 \in \mathbb{Z}_q^n$ where $\tilde{v}_0$ is an n-dimensional vector that contains all zeros.

Definition 4 Learning with Errors Problem (LWE): Given dimension n, modulo q, an error distribution e such that $\sqrt{n} \leq e \leq q$, and $b \in \mathbb{Z}_q$, the LWE problem asks to find a secret $s \in \mathbb{Z}_q^n$, such that $b = \langle s, a \rangle + e \in \mathbb{Z}_q$ where $a \in (_q^n$ and $\mathbb{Z}s$, a $\rangle$ denotes the inner-product between s and a. The decision version of the same problem asks to distinguish a collection of pairs from truly random pairs.

Definition 5: Cryptographic Pseudorandom Number Generators (CPRNG): A CPRNG, G is a deterministic algorithm that takes a uniform input seed and produces a pseudorandom output. Given a short uniform seed s, G is a CPRNG satisfies the following properties:
  $\forall s, L(G(s)) > L(s)$ where L is gives the string length.
  $|Pr[\mathcal{T}(G(s)) = 1] - Pr[T[\mathcal{T}[(r) = 1]]| \leq \epsilon$ where $\epsilon$ is a negligible value, $\mathcal{T}$ is an efficient statistical randomness test (distinguisher), and $r \in \{0,1\}^{L(G(s))}$.

Definition 6: Pre-computed Algebraic Commitments (PAC). PACs are computationally-expensive cryptographic tokens, which may be created in an offline phase, and used in an online phase, for computational saving. The generation and use of PACs in the systems and methods described herein involves new processes and applications. A PAC may be created using the various techniques described herein, but in terms of computational steps a method such as the following example could be used to generate a PAC:
1)

$$r_i \xleftarrow{\$} \mathcal{D}$$

for all i=1 to K where $r_i$ is selected from a specified distribution $\mathcal{D}$ which is random-uniform.
2) $R_i \leftarrow AOWF(r_i)$ for all i=1 to K (All $R_i$ are disclosable randomnesses)
3) $\mathcal{U} \leftarrow \mathcal{U} \cup \{r_i, R_i\}$ for all i=1 to K where $\mathcal{U}$ is a set that stores the commitments.

Definition 7: A Proof of Work operation generally follows a standard scheme, although the implementation and structure of PoW algorithms is modified per the present disclosure as part of overall systems for achieving energy savings and reducing computational waste. Generally speaking a scheme for a PoW operation has three algorithms or concepts:
  $c \leftarrow Gen(1^\kappa)$: Generates the challenge c given the security parameter $\kappa$
  $\pi \leftarrow Solve(c)$: Satisfies the requirements of the challenge c and generates the proof $\pi$.
  $\{0, 1\} \leftarrow Ver(c, \pi)$: Verifies that the proof $\pi$ satisfies the requirements of the challenge c.

Various miners, or nodes of processing resource, attempt to solve the puzzle by finding a nonce v such that $H(B_C \| v) > T$ (target value) where $\|$ denotes concatenation and $B_C$ denotes the block content. The first miner with such a nonce keeps the reward.

Definition 8: A PoW algorithm can be thought of as secure if, given a time measurer $\mathcal{M}(f)$ that takes the function F as input the average execution of PoW. Solve and PoW. Ver with a challenge c it holds that:

$$\Pr[\mathcal{M}(\text{PoW.Ver}(c_i, \pi_i)=1)] \approx \Pr[M(\text{PoW.Solve}(c_i) > \theta(\kappa))]$$

where $\theta(\kappa)$ is the expected time of a brute-force solution on a PoW puzzle with difficulty $\kappa$.

PoUR-Style Algorithm Examples

A non-limiting description of one generic way of considering a PoUR-style algorithm is provided below. It is to be understood that the representations and steps provided in the Algorithms below are meant for example purposes, and other variations are contemplated. These descriptions are meant merely as a starting point to illustrate usage of PoUR in other cryptographic settings, such as in offline-online cryptographic settings as well as instantiations in elliptic-curve and post-quantum settings. In the illustration below, $\vec{m}: (m_1, \ldots m_n)$ means a vector of messages. $\{0, 1\}^*$ denotes a string with arbitrary length, and BR denotes block randomness.

---
Algorithm 1 Generic Constructions of PoUR
---

$c \leftarrow \text{PoUR.Gen}(1^K)$:
1: $i = 0$
2: do

3: $s_i \xleftarrow{\$} \mathcal{D}, r_i \leftarrow G(s_i \| B_r)$

4: $R_i \leftarrow \text{AOWF}(r_i), \mathcal{U} \leftarrow \mathcal{U} \cup \{(r_i, R_i)\}, i = i + 1$
5: while $H(B_c \| R_i) < T$
6: return $\pi = (s_{i-1}, R_{i-1})$
Note: We disclose only a single PAC out of the $2^{32}$ (on average) PACs we save. Therefore, our $2^{32}$ (on average) −1 PACs are processable and we save the energy that would have been needed to create the commitments.
  $\{0, 1\}$ $\text{PoUR.Ver}(c = (B_c, T, B_R), \pi = (s, R))$:
1: $r' \leftarrow \text{AOWF}(G(s \| B_R))$
2: if $\text{AOWF}(r') = R$ & $G(B_c \| R) \geq T$ then
3: return 1
4: return 0

---

Application of Improved PoW Algorithms in Cryptographic Functions—Example Set #1

In blockchains with public-key infrastructure, online stage execution time is crucial. Thus, it may be beneficial to pre-compute the computationally expensive algebraic commitments in $\mathcal{U}$ during the offline phase, for faster execution in the online phase. CryptOp.process can be thought of as a function for cryptographic operations like encryption, signing, etc. whereas CryptOp.verify refers to its verification.

---
Algorithm 2 Offline-Online Settings with PoUR
---

$\mathcal{U} \leftarrow \text{PoUR.Offline}(1^K)$:
1: $c \leftarrow \text{PoUR.Gen}(1^K), \pi \leftarrow \text{PoUR.Solve}(c)$ //Comment: PACs are in $\mathcal{U}$
2: if $\text{PoUR.Verify}(c, \pi) = 0$ then
3:   Go Back to Step 1
  $(\mathcal{F}, \mathcal{R}) \leftarrow \text{PoUR.Online}(\vec{m}, \mathcal{U})$
1: for i = 1 to n do
2:   $(r_i, R_i) \leftarrow$ Pick and remove from $\mathcal{U}$, $\mathcal{R} \leftarrow \mathcal{R} \cup \{(R_i)\}$
3:   $\mathcal{F} \leftarrow \mathcal{F} \cup \text{CryptOp.process}(r_i, R_i, m_i)$
4:   return $(\mathcal{F}, \mathcal{R})$
  $\{0, 1\} \leftarrow \text{PoUR.Verify}(\vec{m}, F, R)$
1: Let $\mathcal{F}: (f_1, \ldots, f_n), R: (R_1, \ldots, R_n) \vec{m} = (m_1, \ldots, m_n)$
2: for i = 1 to n do
3:   $f_i \leftarrow$ Pick from $\mathcal{F}, R_i \leftarrow$ Pick from $\mathcal{R}$
4:   if $\text{CryptOp.verify}(R_i, f_i, m_i) = 0$ then
5:     return 0
6:   return 1

---

The following example algorithm illustrates one way of conceptually constructing how a PoUR-style algorithm can utilize PACs and thus save energy in ECDLP settings. SchnorrQ signatures are used for illustrative purposes, but any other digital signatures would likewise benefit from a PoUR-style algorithm in a similar manner. Note that (k, K) represents a public, private key pair. The key generation, signature generation and verification functions are denoted by Kg, Sig, Ver respectively. Rx means the x-coordinate of R. P is the elliptic curve generator.

---
Algorithm 3 PoUR Construction in Elliptic-Curves and its usage in SchnorrQ Signature
---

$c \leftarrow \text{PoUR.Gen}(1^K)$:
1: Choose a target value T
2: Let $(B_c, B_R) \in \{0,1\}^*$
3: return $c = (B_c, T, B_R)$
  $\pi \leftarrow \text{PoUR.Solve}(c = (B_c, T, B_R))$:
1: $i = 0$
2: do 3: $s_i \xleftarrow{\$} \mathbb{Z}_q^*$ 4: $r_i \leftarrow H(s_i \| B_R)$
5: $R_i \leftarrow r_i \cdot P$ //P is elliptic curve generator
6: $\mathcal{U} \leftarrow \mathcal{U} \cup \{(r_i, R_i)\}$
7: $i = i + 1$
8: while $H(B_c \| R_i) < T$
9: return $\pi = (s_{i-1}, R_{i-1})$
  $(0, 1) \leftarrow \text{PoUR.Ver}(c = (B_c, T, B_R), \pi = (s, R))$:
1: $t \leftarrow H(s \| B_R)$
2: if $P \cdot t = R$ and $H(B_c \| R)) \geq T$ then
3:   return 1
4: return 0
  $(k, K) \leftarrow \text{SchnorrQ.Kg}(1^K)$:
1: $(k, K) \leftarrow$ Pick and remove from $\mathcal{U}$ and return (r, R)
  $\sigma \leftarrow \text{SchnorrQ.Sig}(k, M)$
1: $(r, R), \leftarrow$ Pick and remove from $\mathcal{U}$
2: $e \leftarrow H(M \| R_x)$ //$R_x$: x coordinate of the point R
3: $s \leftarrow r - e \cdot k$
4: return $\sigma = (s, e)$
  $\{0, 1\} \leftarrow \text{SchnorrQ.Ver}(K, M, \sigma = (s,e))$:
1: $R' \leftarrow K \cdot e + P \cdot s$
2: if $e = H(M \| R_x')$ then

| Algorithm 3 PoUR Construction in Elliptic-Curves and its usage in SchnorrQ Signature |
|---|
| 3: return 1 |
| 4: else |
| 5: return 0 |

A PoUR-style algorithm can also be utilized for Lattices. In the explanation below, $\phi$ denotes the coefficient threshold. $R_q^l$ means a vector with l elements. $R_q^{m \times l}$ means a matrix with dimensions m×l. $S_\phi^l \in R_q^l$ and G is the generator in $R_q^{m \times l}$. We leverage the sampling operation in lattices Samp( ) to incorporate the $B_R$ in our secret. β means the maximum coefficient. High and Low refer to using high and low bits due to signature compression in Dilithium. $\|z\|$ denotes the norm operation on z and ∞ means norm infinity.

| Algorithm 4 PoUR Construction in Lattices and its usage in Dilithium Signature |
|---|
| c ← PoUR.Gen($1^K$) |
| 1: Choose a target value T |
| 2: Let ($B_c$ , $B_R$) ∈ {0, 1} * |
| 3: return c = ($B_c$ , T, $B_R$) |
| π ← PoUR.Solve(c = ($B_c$ , T, $B_R$): |
| 1: i = 0 |
| 2: do |
| 3: $s_i \xleftarrow{\$} S_\phi^l$ |
| 4: $r_i$ ← Samp($s_i$, $B_R$) |
| 5: $R_i$ ← G · $r_i$ |
| 6: $e_i \xleftarrow{\$} S_\phi^l$ |
| 7: $\mathcal{U} \leftarrow \mathcal{U} \cup (r_i, e_i)$ |
| 8: i = i + 1 |
| 9: while H($B_c$ ‖ $R_{i-1}$) < T |
| 10: return π = ($s_{i-1}$, $R_{i-1}$) |
| (0, 1) PoUR.Ver(c = ($B_c$ , T, $B_R$), π = (s, R)): |
| 1: x ← Samp(s, $B_R$) and |
| 2: return G · x = R and H($B_c$ ‖ R)) ≥ T |
| σ ← Dilithium.Sig(k, M) |
| 1: do |
| 2: (r, e) ← pick from $\mathcal{U}$ |
| 3: w ← G · r, c ← H(High(w) ‖ M) |
| 4: z ← y + c · r |
| 5: while $\| z \|_\infty \geq \phi_1 - \beta$ or $\| Low(w - c \cdot e), M) \|_\infty \geq \phi_2 - \beta$ |
| 6: return σ (z, c) |
| (0, 1) ← Dilithium.Ver(K, M, σ) |
| 1: α ← H(High(G · z − c · t) ‖ M) |
| 2: if $\| z \|_\infty < \phi_1 - \beta$ and H(M ‖ α) = c then |
| 3: return 1 |
| 4: return 0 |

Per the above explanations and examples, it can be seen that alternative constructions of PoUR are possible. For example:

Key-Exchange: PACs created during PoUR can be used as session keys during key-exchanges. Signcryption: PACs created during PoUR can be used in signcryption when the public-keys are known prior to mining.

Zero-Knowledge Proofs: PoUR provides support for creating PACs for zero-knowledge proof constructions such as the same way it provides support with digital signatures.

Cryptographic Beacons: We could store the random beacon outputs during consensus with PoUR.

It is recognized that, due to the generation of PACs, a single iteration of a hash operation (or other puzzle solving attempt) in PoUR can take more time than a single iteration of the same operation in a traditional PoW. However, this does not result in an overall loss in performance for a company's network (or performance of the PoUR network and a user/consumer of the PACs) because it is possible to adjust the target value of the puzzle and use PoUR instead of PoW so that we do not give up on the hardness of the puzzle and also leverage a useful PoW. Likewise, the consumer of the PACs has substantially reduced computational needs as a result of the pre-computed commitments.

Implementations and Example Systems

Figure 4:
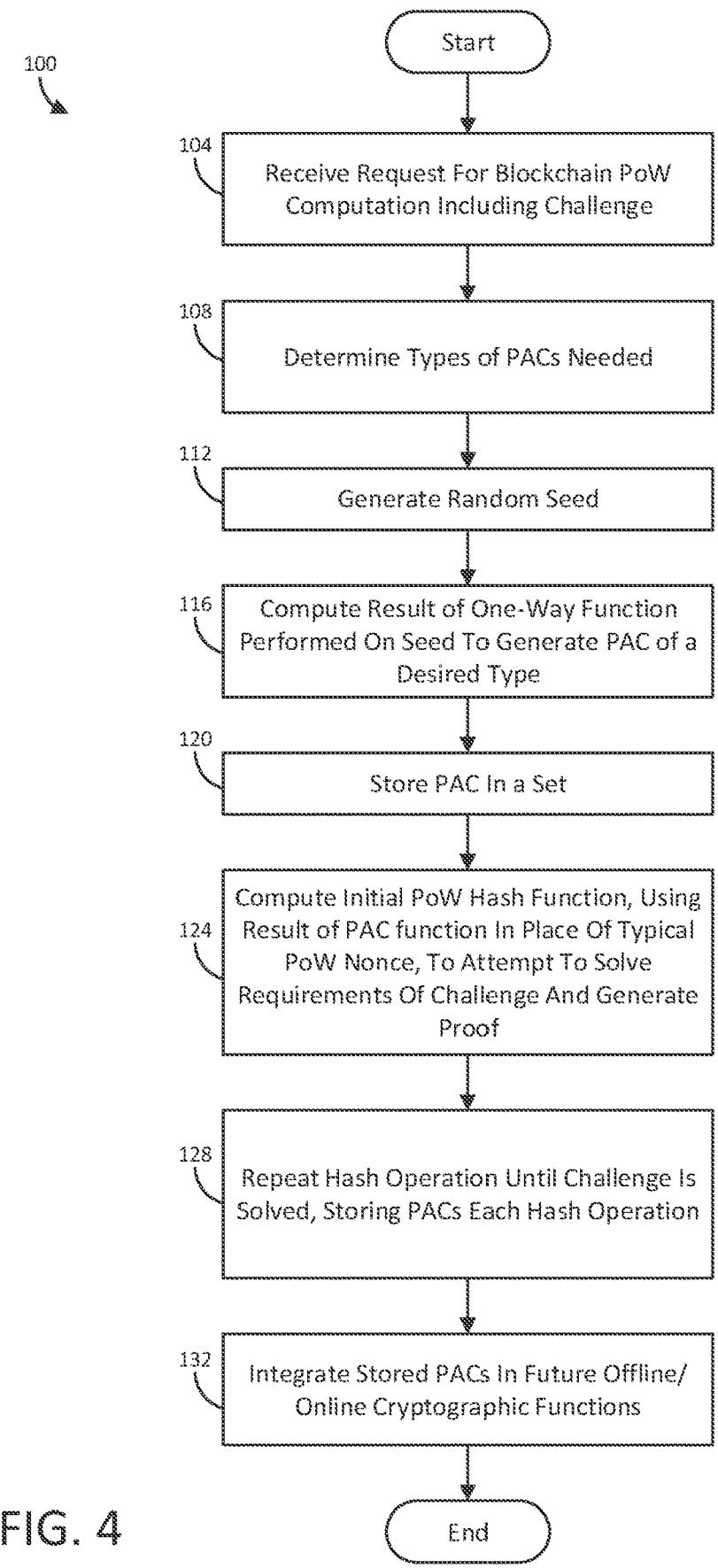
FIG. 4 is a flow chart showing a high level process or leveraging generation of randomness in performing Blockchain PoW operations.

Referring now to FIG. 4, an exemplary process 100 for more efficiently computing cryptographic operations is described. The process can involve generating pre-computed algebraic commitments (PACs), and in some embodiments, the PACs can be utilized in applications such as key exchanges, signcryption (e.g., digital signatures), post-quantum type applications, zero-knowledge proof constructions, cryptographic beacons, and/or other suitable cryptography and/or security applications. In some embodiments, the process 100 can be implemented as computer readable instructions on at least one memory and executed by at least one processor coupled to the at least one memory.

At step 104, the process 100 can receive a request for a blockchain PoW computation. For example, the processor operating the process may be a node or miner for a Bitcoin or other cryptocurrency network, or may be a node in any other blockchain-based scheme (e.g., Blockchain records for commodities, real estate, contracts, or other applications). The request for the PoW computation may include a challenge, including various parameters such as a target.

At step 108, the process 100 can determine types of PACs needed. In some embodiments, the process 100 can receive a request for one or more types of PACs. For example, the type of PACs needed may include PACs used in digital signature applications or other cryptographic functions. In other embodiments, the network in which the processor is operating may have its own need for cryptographic commitments which may be pre-determined. More than one type of PAC may be needed, or a single type of PAC. A company, such as a banking institution or online transactions marketplace that employs a system utilizing PoUR-style techniques may determine that its business will consume a high volume of public key pairs, such as for use in digital signature applications. As described below, the primitives, or preliminary randomness needed for those applications can be requested from the company's computation resources performing, e.g., a PoW function to support a Blockchain-based record system.

At 112, the process 100 can generate a random seed. This may be done according to the methods described above. The seed value will be used as, or used to generate, the "nonce" value concatenated in a PoW Blockchain function.

At 116, the process 100 can compute a result of a one-way function performed on the seed to generate a PAC of a desired type, such as an AOWF. For example, to generate a SchnorrQ Signature PAC, the process 100 can compute an r value (the secrete value) based on the seed value and an R value (the public value) based on the r value using an elliptic curve generator as further described in the Algorithms set forth in Example Sets 1 and 2. The PAC can include a pair of values, which include the initial and output values of the AOWF, e.g., the r and R values as described in the Algorithms above. Depending upon the type of commitment desired, the process of generating the PAC pair may vary.

Thus, having knowledge of the types of PACs desired allows the process to perform the right Algorithm to generate the right type of PAC, so that the PAC can be used in a desired cryptographic function in the future.

At 120, the process 100 can store the PAC in a set $\mathcal{U}$. The set $\mathcal{U}$ can include a number of other PACs of the same type of the PAC generated at 116, and may also include other types of PACs. The set of PACs may be stored in a memory connected to a network common to the processor and/or other processors that will operate future cryptographic functions utilizing the PACs. Or, the memory may service remote/third party processors (e.g., through a subscription basis); in this instance a service provider could utilize its resources to function as a PoW processor (e.g., a Bitcoin miner), then also provide cryptographic commitments to third parties who may need them, through a secure transfer.

At 124, the process 100 can compute an initial PoW hash function using the result of the PAC calculation (e.g., at 116) in place of a typical PoW nonce to attempt to solve requirements of the challenge and generate a proof. In some embodiments, to solve an Elliptic curve hash function, the process 100 can calculate a hash value based on the R value included in the PAC. This may be advantageous, as the R value may be disclosed when proving that the puzzle was solved, and the R value would be the public or disclosable part of the PAC. In other embodiments, the hash function may be performed on the initial random number (e.g., r, rather than R), which is the other value in the PAC pair.

At 128, the process 100 can repeat the hash function until the challenge is solved, storing the PAC generated and used in each hash function calculation in the set $\mathcal{U}$.

At 132, the process 100 can integrate the PACs stored in the set $\mathcal{U}$ into future offline/online cryptographic functions. In some embodiments, the stored PACs can be used in SchnorrQ Signature functions, other digital signature functions, or other applications as described in the Appendices hereto.

Figure 5:
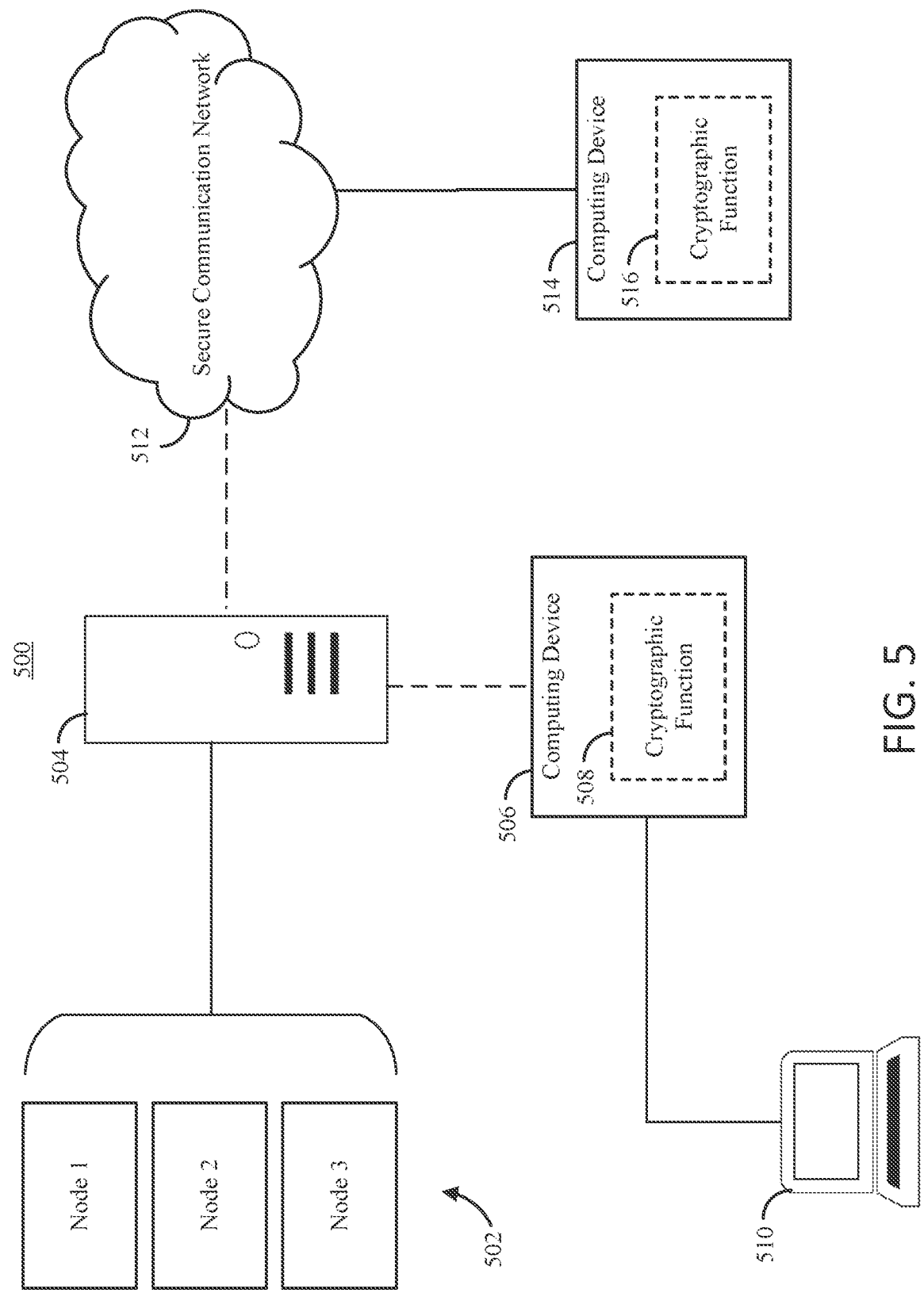
FIG. 5 is a block diagram showing hardware and network implementations of systems that perform the techniques and processes described herein, as well as data flow between the components of the implementations.

Referring now to FIG. 5, an example network or system architecture 500 is shown. In the architecture, a set of processing nodes 502 are provided. Each node may include a separate processor, or these may be virtual nodes within a cloud or shared computational network. The nodes 502 are operating a set of software instructions which cause them to perform PoW operations in accordance with the various techniques and algorithms described above. For example, nodes 502 may be performing hashing functions or other operations to attempt to solve a PoW puzzle. Thus, nodes 502 may be receiving requests for PoW operations, which may include a challenge and other parameters such as a target value and identification of how close the node must calculate relative to the target, as well as other parameters typical of PoW operations. In one embodiment, nodes 502 may be miners in a Bitcoin or other cryptocurrency system.

The set of nodes 502 calculate PACs, or other tokens or commitments in the course of their PoW operations. Thus, they are operating PoUR techniques, as described above. The PACs are stored in a networked memory 504. Memory 504 may store the PACS from multiple nodes, or just one node. Similarly, multiple memories 504 may be utilized, e.g., to store the output of individual nodes or sets of nodes, or to store certain types of PACs.

In one optional embodiment, the memory 504 may provide the PACs to another computing device 506 within the same network as the nodes 502. For example, nodes 502 and computing device 506 may be processors (or virtual processors) of the same companies network. Computing device 506 may be performing software operations that involve a cryptographic function (e.g., such as processing digital signatures) in the course of business. Thus, computing device 506 can draw PACS from memory 504 as cryptographic operations are performed, and use them with remove device 510. For example a public and private key (a set of values of a PAC, for example) may be shared between the computing device 506 and the remote device 510, with each device having the public or private key depending on the operation between them. Computing device 506, therefore, will need to perform fewer computations and will consume less energy in performing its ordinary operations, than if computing device needed to compute random numbers and PACS for each of its cryptographic operations.

Alternatively, or in addition to the connection to computing device 506, memory 504 may be connected via a secure connection 512 to a computing device 514 of another network (such as a processing device of another company). Computing device 514 may, thus, draw PACs from memory 504 as need when computing device 514 performs its own cryptographic function.

As computing devices 506 and/or 514 draw PACS from 504, those PACS may be deleted from memory 504 or designated as no longer usable. Or, PACs may be reused in differing operations. In this sense, memory 504 can be thought of as a stack or server that manages the distribution of PACs to computing devices that would otherwise need to generate their own random values and cryptographic tokens or commitments.

In one experiment, the function of a node 502 was performed by an Intel i&-8750H 2.20 GHz process with 32 GB of RAM (of course, at larger scales, the processing could come from much larger processing arrays). The processing node operated as part of the Bitcoin infrastructure, but the classical Bitcoin PoW was replaced with a PoUR algorithm which allowed for the creation of commitments during consensus, for later use in other operations. The node executed the open source code of Dilithium for generating post-quantum commitments. For elliptic-curve commitments, the node operated the SchnorrQ implementation of the FourQlib library. The energy savings and power consumption were measured by executing Intel's powertop tool, which allowed for determination of the power consumption of each process separately with precise measurements. Performance efficiency can be considered in terms of execution and energy savings acquired by the PoUR method. A traditional commitment pair would typically require around 32 KB of storage, which comparatively small in relation to energy savings.

Energy savings were measured for $2^5$, $2^{10}$, and $2^{15}$ commitments and extrapolated to $2^{20}$, $2^{25}$, $2^{30}$, and $2^{35}$ using Matlab. Table 1 shows execution time savings, energy savings, and power consumption rate for the Elliptic-Curve Commitments and Post-Quantum Commitments:

TABLE 1

Experimental Results for Savings in Elliptic-Curve and Post-Quantum Settings

| Puzzle Solving Attempts | Eecution Time Savings (ms) | Energy Savings (J) | Power Consumption Rate (W = J/Sec) |
|---|---|---|---|
| Elliptic-Curve Commitments | | | |
| $2^5$ | 0.306 | 0.0065 | 21.2 |
| $2^{10}$ | 10.6 | 0.2248 | |
| $2^{15}$ | 314.74 | 6.6724 | |

TABLE 1-continued

Experimental Results for Savings in
Elliptic-Curve and Post-Quantum Settings

| Puzzle Solving Attempts | Eecution Time Savings (ms) | Energy Savings (J) | Power Consumption Rate (W = J/Sec) |
|---|---|---|---|
| Post-Quantum Commitments | | | |
| $2^5$ | 2.47 | 0.06 | 25.2 |
| $2^{10}$ | 84.60 | 2.12 | |
| $2^{15}$ | 2596.295 | 65.85 | |

Figure 6A:
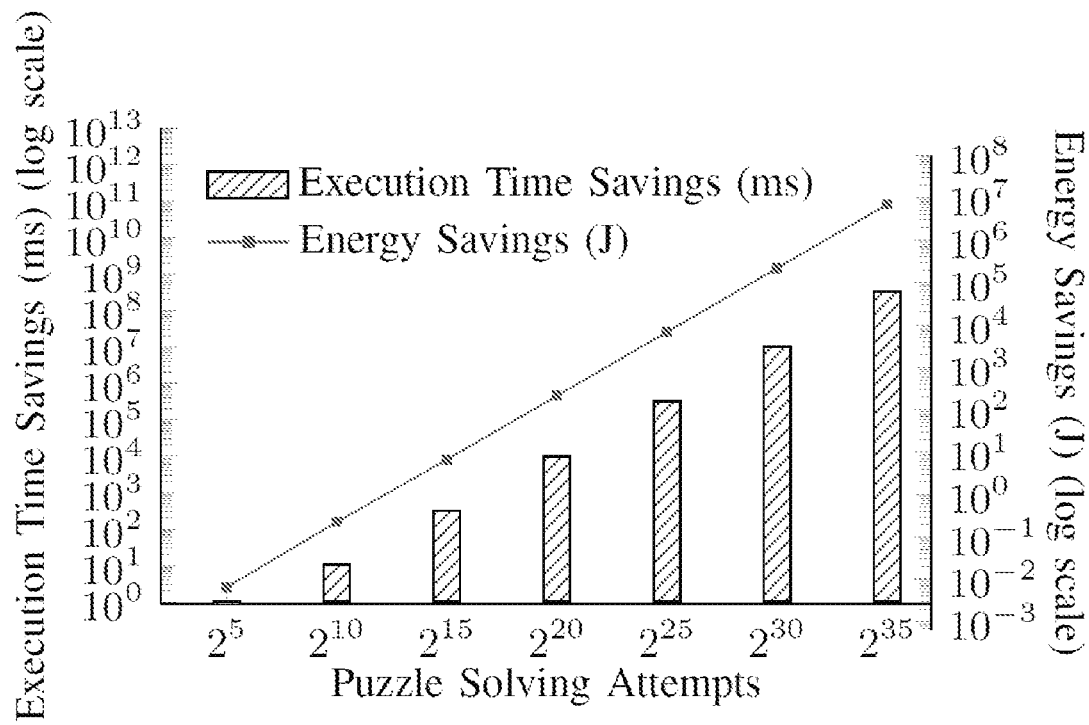
FIGS. 6a and 6b are graphs showing measured savings in energy and execution time from utilization of the systems and methods disclosed herein.
Figure 6B:
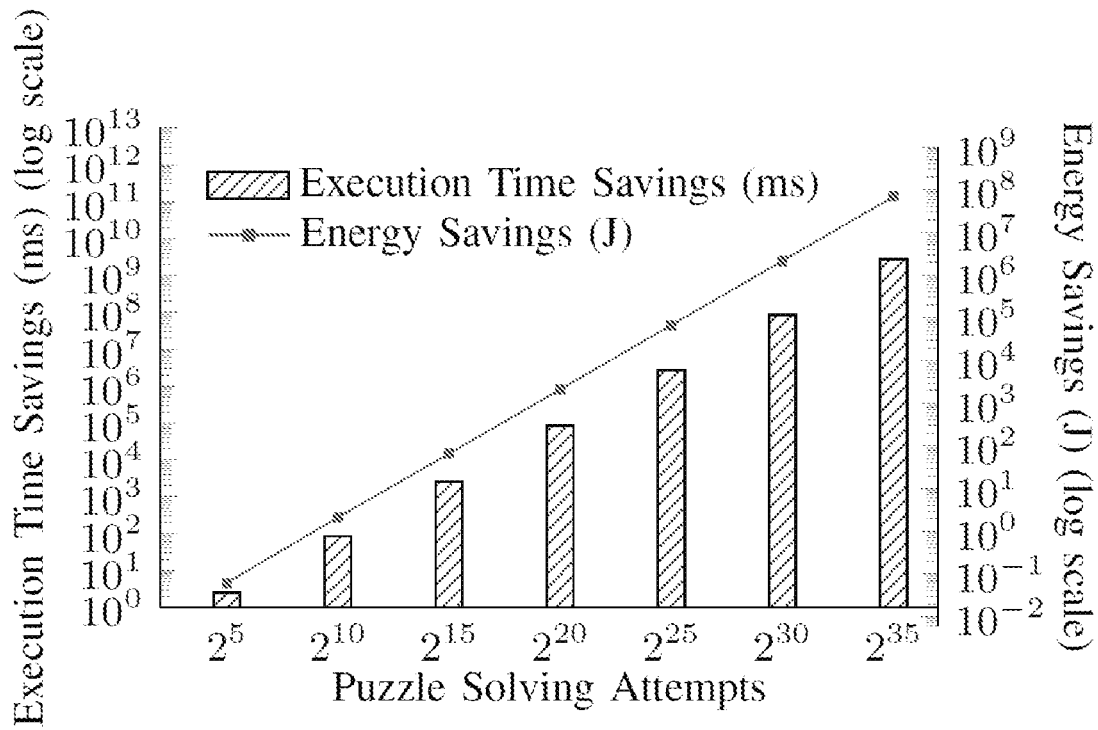

Referring now to FIG. 6, two graphs are shown (6a and 6b). FIG. 6a shows execution time and energy savings for each of the measured number of puzzle solving attempts for Elliptic-Curve Commitments. Similarly, FIG. 6b shows execution time and energy savings for each of the measured number of puzzle solving attempts for Post-Quantum Commitments. As can be seen, the experiments showed that there is a strongly linear relationship between puzzle solving attempts and energy/time savings for both types of commitment generation. And, there is a direct proportionality between execution time savings and energy savings.

In some implementations, PoUR-style algorithms can be thought of as having three phases or operations, each of which has sufficient security for purposes of the types of cryptographic functions to which they may be used: a challenge generation, a challenge solve, and a challenge verification. Generally speaking, the challenge generation can comprise the same function as a traditional PoW generation (such as puzzle generation in Bitcoin infrastructures). Alternatively, the parameters of a challenge generation could be formulated so as to better fit the requirements and dimensionality of a given PAC to be generated. The challenge solve operation can differ from the traditional methods of solving a PoW: it may utilize AOWF and CPRNG, which are both known to be secure (see Definitions above). A PoUR algorithm may contain an additional check that requires the usage of AOWF, which is also secure (see Definitions above). This shows that the challenge solving and challenge verification operations are secure. In other words:

$$P_r[\mathcal{M}(\text{PoW-Solve}(c) > \theta(\kappa)] \approx P_r[\mathcal{M}(\text{PoUR-Solve}(c) > \theta(\kappa)]$$

$$P_r[\text{PoW-Ver}(c,\pi)=1] \approx P_r[\text{PoUR-Ver}(c,\pi)=1]$$

Where PoW is a traditional PoW (e.g., Bitcoin PoW) and θ(K) is the expected time of a brute-force solution on a PoW puzzle with difficulty κ. Therefore, PoUR is secure by Definition 8.

Moreover, implementation or instantiations of a PoUR-style algorithm in offline-online cryptographic settings preserves the security of the underlying cryptographic function, CryptoOp. The security of CryptoOp is dictated by the randomness of its inputs, r and R. The initial, or "secret" value r is generated in a PoUR. Solve function with a CPRNG and R with a AOWF. The generation of r and R is uniform-random. Since the function CryptoOp takes two uniform-random inputs, the instantiations of PoUR-style algorithms in offline-online cryptographic schemes preserves the security of the underlying function CryptoOp.

Similarly, SchnorrQ and Dilithium preserve their security when instantiated with a PoUR-style algorithm. In a SchnorrQ instantiation with PoUR, random-uniform PACs are retrieved during SchnorrQ.Kg and SchnorrQ.Sig. In SchnorrQ.Sig, a hash function can be leveraged that is computationally similar in random oracle. Thus, SchnorrQ preserves security when instantiated with PoUR. In Dilithium instantiations with PoUR, a hash function may be used that is also computationally indistinguishable in random oracle and retrieve PACs. The PACs may be used as in SchnorrQ and Dilithium. Therefore, PoUR-style algorithms retain the security of these signatures.

In this disclosure, an improved PoW algorithm that enforces the creation of cryptographic tokens while solving the PoW puzzle is provided. The improved PoW algorithm is energy efficient, and can provide extra efficiency for many cryptographic operations including offline-online signatures, key exchanges and public key encryption.

Various designs, implementations, and associated examples and evaluations of an improved PoW algorithm are described above. However, it is to be understood the present invention has been described in terms of one or more preferred embodiments, and it should be appreciated that many equivalents, alternatives, variations, and modifications, aside from those expressly stated, are possible and within the scope of the invention.

What is claimed is:

1. A method for reducing energy consumption of cryptographic computations, comprising:
   determining at least one desired type of cryptographic commitment;
   generating a random value;
   transforming the random value into a cryptographic output value;
   performing a Blockchain function based upon at least one of the random value and the cryptographic output value;
   storing the random value and cryptographic output value as a cryptographic commitment of the desired type; and
   providing the cryptographic commitment for subsequent use in a cryptographic operation;
   wherein the stored cryptographic commitment is provided to a processor operating a digital signature operation, such that the processor performs the digital signature operation using the stored cryptographic commitment without generating a new random value.

2. The method of claim 1, characterized in that the Blockchain function is a proof of work operation.

3. The method of claim 1, wherein the Blockchain function is performed with a disclosable value of the random value and the cryptographic output value.

4. The method of claim 1, wherein the random value is converted into a private cryptographic key that pairs with the cryptographic output value.

5. The method of claim 1, wherein the random value is used in a hashing function that outputs a private cryptographic value that pairs with the cryptographic output value.

6. The method of claim 1, wherein the random value is concatenated with a Blockchain string.

7. The method of claim 6, wherein the concatenated random value with the Blockchain string is used in a hashing function that outputs a private crypto graphic value that pairs with the cryptographic output value.

8. The method of claim 7, wherein the private cryptographic value is determined based on a predetermined threshold value.

9. The method of claim 6, wherein the Blockchain string is a string having an arbitrary length.

10. A system comprising:
at least one Blockchain processing node;
at least one memory having stored thereon instructions which, when executed, cause the system to:
 i. perform a proof-of-work operation;
 ii. generate at least one cryptographic commitment while performing the proof-of-work operation;
 iii. store the cryptographic commitment in the at least one memory;
 iv. determine if the proof-of-work operation was solved, and if not repeat steps i-iii;
 v. provide the cryptographic commitment to at least one cryptographic processing node.

11. The system of claim 10, wherein the at least one Blockchain processing node comprises processing resources of a company network, and wherein the memory belongs to the company network.

12. The system of claim 10, wherein the proof-of-work operation comprises a Blockchain challenge.

13. The system of claim 11, wherein the instructions further cause the system to determine a need of the company network for at least one type of cryptographic commitment, and generate the cryptographic commitment specific to such need.

14. The system of claim 10, wherein the instructions further cause the system to determine a need of a third party network for at least one type of cryptographic commitment, and generate the cryptographic commitment specific to such need.

15. The system of claim 10, wherein the proof of work operation is performed based on a random value.

16. The system of claim 15, wherein the random value is converted into a private cryptographic key.

17. The system of claim 15, wherein the random value is concatenated with a Blockchain string.

18. The method of claim 17, wherein the concatenated random value with the Blockchain string is used in a hashing function that outputs a private crypto graphic value.

* * * * *